(12) United States Patent
Harrison

(10) Patent No.: US 8,782,264 B2
(45) Date of Patent: Jul. 15, 2014

(54) SYSTEM AND METHOD FOR VERIFYING PARENTAL APPROVAL

(71) Applicant: Imperium, LLC, Westport, CT (US)

(72) Inventor: Marshall C. Harrison, Fairfield, CT (US)

(73) Assignee: Imperium, LLC, Westport, CT (US)

( * ) Notice: Subject to any disclaimer, the term of this patent is extended or adjusted under 35 U.S.C. 154(b) by 0 days.

(21) Appl. No.: 13/774,055

(22) Filed: Feb. 22, 2013

(65) Prior Publication Data

US 2013/0254288 A1  Sep. 26, 2013

Related U.S. Application Data

(60) Provisional application No. 61/613,044, filed on Mar. 20, 2012.

(51) Int. Cl.
| | |
|---|---|
| G06F 15/16 | (2006.01) |
| G06F 15/173 | (2006.01) |
| H04L 12/58 | (2006.01) |
| G06Q 20/34 | (2012.01) |
| G06Q 20/42 | (2012.01) |
| H04L 29/08 | (2006.01) |
| H04L 29/06 | (2006.01) |

(52) U.S. Cl.
CPC .............. *H04L 51/00* (2013.01); *H04L 67/22* (2013.01); *G06F 2221/2149* (2013.01); *H04L 63/101* (2013.01); *G06Q 20/35785* (2013.01); *G06Q 20/425* (2013.01)
USPC ............................................. 709/229; 709/225

(58) Field of Classification Search
CPC ............ G06F 2221/2149; H04L 67/22; H04L 63/101; H04L 63/102
USPC ................................................. 709/225, 229
See application file for complete search history.

(56) References Cited

U.S. PATENT DOCUMENTS

| | | | | |
|---|---|---|---|---|
| 6,745,367 | B1 * | 6/2004 | Bates et al. | 715/205 |
| 8,219,542 | B2 * | 7/2012 | Niejadlik | 707/709 |
| 8,478,734 | B2 * | 7/2013 | Niejadlik | 707/709 |
| 2003/0037250 | A1 * | 2/2003 | Walker et al. | 713/200 |
| 2005/0102407 | A1 * | 5/2005 | Clapper | 709/228 |
| 2012/0047560 | A1 * | 2/2012 | Underwood et al. | 726/4 |

* cited by examiner

*Primary Examiner* — Jeong S Park
(74) *Attorney, Agent, or Firm* — McLane, Graf, Raulerson & Middleton, Professional Association

(57) ABSTRACT

An improved system and method enable website operators and online service providers to verify parental approval for access by underage users, e.g., for compliance with COPPA. The system and method herein also enable parents to monitor what sites their children have approval to visit; enable parents to withdraw approval at any time for any site(s) previously approved using the system and method described herein; and enable website operators/online service providers to admit or prevent children from logging in or accessing online services or content based on real time parental approval data.

20 Claims, 6 Drawing Sheets

SYSTEM AND METHOD FOR VERIFYING PARENTAL APPROVAL

CROSS-REFERENCE TO RELATED APPLICATION(S)

This application claims priority under 35 U.S.C. §119(e) to U.S. Provisional Application No. 61/613,044 filed Mar. 20, 2012, the entire contents of which are incorporated herein by reference.

BACKGROUND

The present disclosure relates generally to the field of parental consent, e.g., for purposes of COPPA compliance, and more particularly, to a system and method which enable Internet service or content providers to verify parent or guardian consent in connection with the online collection of information from children under the age of 13 and their online participation.

The Children's Online Privacy Protection Act (COPPA) regulates the online collection of personal information from children less than 13 years of age. The primary goal of the COPPA Rule is to give parents control over what information is collected from their children online and how such information may be used. The Rule applies to operators of websites and online services directed to children under 13, as well as to general audience websites that knowingly collect personal information from children under 13.

The method currently in use for compliance is typically "email plus." The "email plus" mechanism allows a website operator to request that the parent provide consent in an email message. However, this mechanism requires an additional step after receiving the parent's email consent to confirm that it was, in fact, the parent who provided consent (the "plus" factor). These additional steps include: (1) requesting in the initial email seeking consent that the parent include a phone or fax number or mailing address in the reply email, so that follow up is possible to confirm consent via telephone, fax, or postal mail; or (2) after a reasonable time delay, sending another, confirmatory email to the parent to confirm consent, wherein the confirmatory email contains all of the original information contained in the direct notice and informs the parent that he or she can revoke the consent as well as how to revoke the consent. This method is very open to fraud and imposes considerable administrative costs on the web site owner. In addition, the "email plus" mechanism of obtaining parental consent is only available to operators that collect personal information for internal use only.

In December 2012, the Federal Trade Commission ("FTC") issued final amendments to the COPPA Rule, the first extensive revision by the FTC since COPPA become effective in 2000.

The FTC's amendments include the following revisions and clarifications:
  Modified or expanded definitions of the terms "operator," "personal information," and "website or online service directed to children."
  The definition of "personal information" in COPPA has been expanded to include not only traditional data points (e.g., name, address, email address, etc.), but also IP addresses, device identifiers, website cookies, internal customer ID numbers (such as a panelist ID), geolocation information, screen names/user names, photographs, video, and audio containing a child's image or voice, and mobile device unique identifiers.
  the definition of "collects or collection" has been updated to include of passively collecting personal information from children online, irrespective of the technology used and not merely personal information that is mandatory to participate.
  A new compliance option is available for a subset of websites and online services that are considered "directed to children," but do not target children as their primary audience in which the COPPA Rule applies only to visitors who self-identify as under age 13; whereas, websites or online services whose primary target audience is children must continue to presume that all users are children.
  In additional to traditional websites and online services, third parties such as mobile application developers, software plug-in developers, and advertising networks that gather information from children under 13 are also responsible for obtaining parental permission before allowing children to use their services.

Thus, it would be desirable to provide an online parental verification system and method which provides a streamlined mechanism for providing notice and obtaining parental consent as well as providing a mechanism for parents to withdraw consent or manage their children's accounts.

SUMMARY

Accordingly, the present disclosure provides an improved system and method for ensuring COPPA compliance which enable website operators and online service providers to comply with the law; enable parents to monitor what sites their children have approval to visit; enable parents to withdraw approval at any time for any site(s) previously approved using the system and method described herein; and enable website operators/online service providers to admit or prevent children from logging in or accessing online services or content based on real time parental approval data.

In one aspect, a method is provided, which includes receiving, in a computing device, a request to access content on a computer network, the request including an indication that the request is by an underage user. A page for submitting contact information for a parent of the underage user is presented to the underage user by the computing device. An electronic communication is transmitted to the parent of the underage user by the computing device, the electronic communication including a link to a website of a third party validator, the website of the third party validator including an interface allowing the parent to grant approval of the underage user to access the content. The interface receives input of one or more items of personal information associated with the parent for validation of the parent's identity by the third party validator. An indication from the third party validator of whether or not the parent's identity has been validated based on the one or more items of personal information is received in the computing device. If the parent's identity has been validated, the underage user is allowed to access the content.

In a more limited aspect, the content is selected from an Internet website and a mobile application.

In another more limited aspect, if the parent's identity has been validated, the parent is informed that the parent's identity has been validated.

In another more limited aspect, if the parent's identity has been validated, the parent is provided with instructions for logging on to the third party validator website for reviewing and/or withdrawing the approval.

In yet another more limited aspect, information indicating whether a prior approval has been withdrawn by the parent is received from the third party validator prior to allowing the underage user to access the content. If the prior approval has been withdrawn by the parent, the underage user is notified that approval has been withdrawn and the underage user is denied access to the content.

In still another more limited aspect, if the parent's identity has not been validated, the underage user is denied access to the content.

In another more limited aspect, if the parent's identity has not been validated, the parent is informed that the one or more items of personal information could not be verified and, optionally, the parent is presented with one or more opportunities to grant approval to the underage user to access the content.

In still another more limited aspect, the one or more opportunities to grant approval to the underage user to access the content are selected from one or more of an interface for the parent to enter the parent's full or partial (e.g., last four digits) social security number; an interface for a spouse of the parent to enter one or more items of personal information associated with the spouse for verification of the spouse's identity by the third party validator; and, an interface for another relative of the underage user to enter one or more items of personal information associated with the relative for verification of the relative's identity by the third party validator.

In yet another more limited aspect, the one or more items of personal information associated with the parent are selected from any one or more of the parent's name, address, phone number, date of birth, and last four digits of the parent's social security number.

In a further more limited aspect, the content is a website that requires users to register personal information with the website prior to accessing the website.

In still a further more limited aspect, the indication that the request is by an underage user is an indication that the user is under 13 years of age.

In yet another more limited aspect, the one or more items of personal information includes address information, and the method further includes using an IP address of the parent to identify a geographic location of the parent; comparing the geographic location of the parent to the address information; and, if the geographic location is inconsistent with the address information, determining that the parent identity cannot be validated.

In still another more limited aspect, an IP address of the parent is used to identify a geographic location of the parent; an IP address of the underage user is used to identify a geographic location of the underage user; and, if the geographic location of the parent is inconsistent with the geographic location of the underage user, it is determined that the parent identity cannot be validated.

In yet another more limited aspect, the number of underage users associated with the parent and/or the number of websites approved for the underage user are monitored and if the number of underage users associated with the parent or exceeds a predetermined threshold and/or the number of sites for the underage user exceed a predetermined threshold, an indication of nonvalidation of the parent's identity is returned.

In another aspect, a method of verifying parental approval to access of content by an underage user includes receiving, in a computing device, a request to verify personal information of the parent disclosed by a parent in association with said parental approval. The identity of the parent is validated using the personal information disclosed by determining whether the disclosed parental information matches information associated with the parent stored in an information database managed by a third party. If the identity of the parent is validated, the parent is informed that the identity of the parent was validated and that the child has access to the requested website. If the identity of the parent cannot be validated, the parent is informed that the identity of the parent could not be validated.

In a more limited aspect, if the identity of the parent cannot be validated, the parent is requested, using the computing device, to input additional information associated with the parent and/or of another person authorized to grant approval for the underage user to access the content.

In another aspect, an identity validation system for verifying approval of a parent granted to allow an underage user to access content on a computer network includes a processor for executing program code and memory combined with the processor for storing the program code. A user interface receives one or more items of personal information associated with the parent. A verification module validates the identity of the parent by comparing the one or more items of personal information with information associated with the identity stored in an information database managed by a third party and a parent module includes computer storage that associates currently approved content with the underage user. In a more limited aspect, the parent module associates currently approved content for a plurality of underage users associated with the parent. In another more limited aspect, the parent module includes a user interface for receiving parental input withdrawing a previously granted approval. In yet another more limited aspect, the parent module includes a user interface for receiving parental input reapproving a previously withdrawn approval.

It is to be understood that both the foregoing general description and the following detailed description are exemplary and explanatory only and are not restrictive of the invention as claimed. The accompanying drawings, which are incorporated in and constitute a part of the specification, illustrate presently preferred embodiments of the invention and, together with the general description given above, and the description of the preferred embodiments given below, serve to explain the principles of the invention.

BRIEF DESCRIPTION OF THE DRAWINGS

The following is a brief description of each drawing used to describe the present invention, and thus, is being presented for illustration purposes only and should not be limitative of the scope of the present invention.

DETAILED DESCRIPTION OF THE PREFERRED EMBODIMENTS

Figure 1:
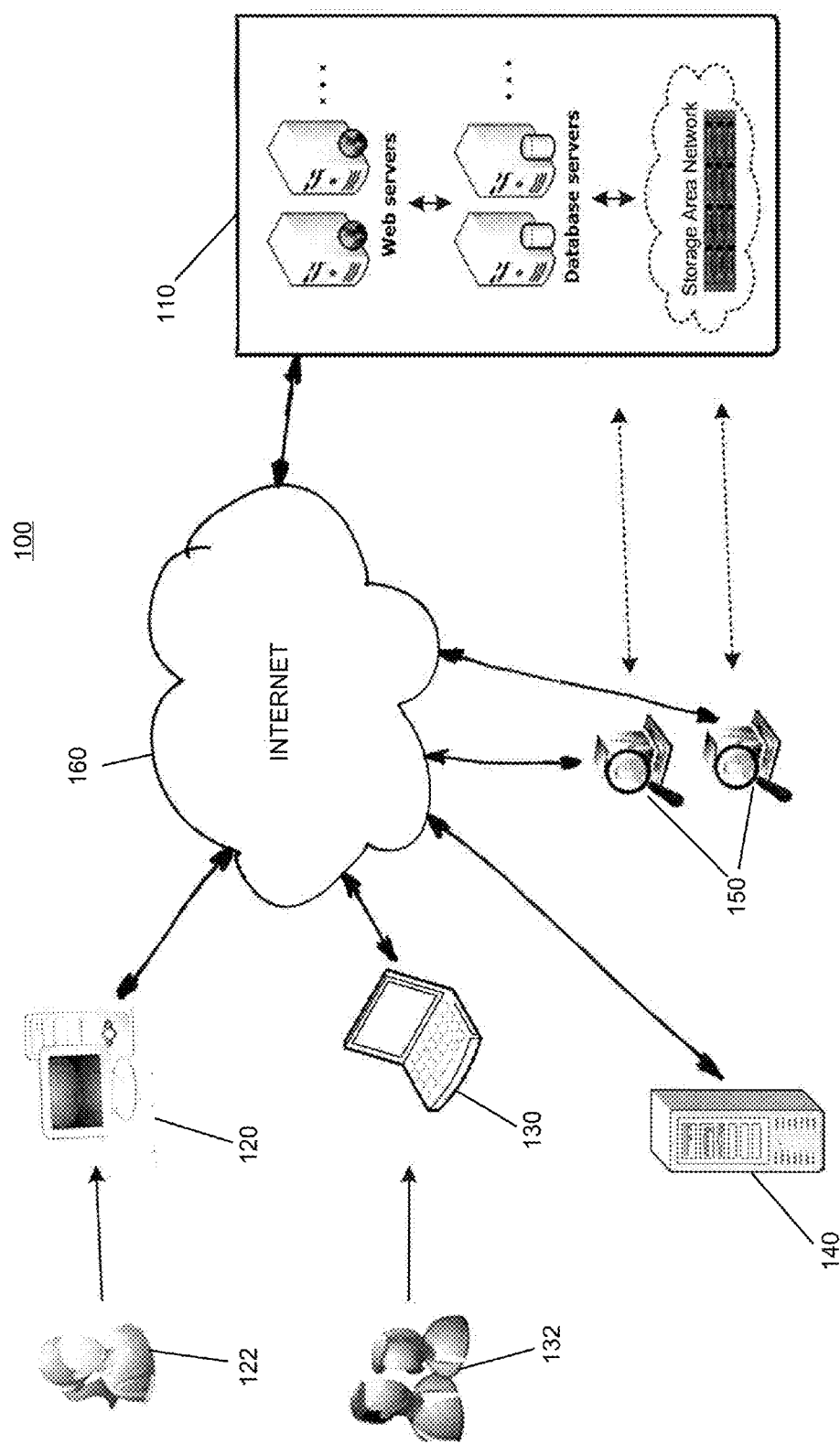
FIG. 1 is a block diagram illustrating an exemplary embodiment of the present invention.

With reference to FIG. 1, a block diagram depicting an exemplary networked, computer-based information handling system 100 in accordance with a preferred embodiment of the present invention is shown. The information handling system 100 includes one or more network servers or server systems 110 interconnected with one or more remotely located client computer systems, including a client computer system 120 configured to allow a user, such as a child user 122 (e.g., a child under the age of 13), to access online content or services provided by an internet service or content provider 140, for example, using a web browser over a network 160 such as the Internet.

The illustrated embodiment also depicts a second client computer system 130 operated by the child's parent(s) or guardian(s) 132 connected with the network 160, although it will be recognized that the present development can also be employed where the parent and child utilize a common computer system. The server computer system may be the server system of a third party verification service provider, such as ChildGuardOnline$^{SM}$. The server computer system 110 includes verification software in accordance with this disclosure. Servers 150 connected to the network 160 may be third party information service providers or data vendors, such as EXPERIAN, AXIOM, and others. The server computer systems 110, 140, 150, and the client computer systems 120, 130 and may be, for example, a computer-based information handling system 200 as described below by way of reference to FIG. 2.

Although one child user 122 is shown for ease of exposition, it will be recognized that the present system and method allows the parent/guardian users 132 to grant and withdraw consent for any number (or all) of their children/wards. Likewise, only one parent user 132 and one website server 140 are shown for the sake of brevity and it will be recognized that the present system and method is intended for use by any number of parents 132 and any number of website operators or online service providers 140. Unless stated otherwise, the term "parent" used herein is also intended to encompass legal guardians and others acting in a similar capacity.

With continued reference to FIG. 1, although the present invention will be described primarily herein by way of reference to a personal computer equipped with a web browser, it will be recognized that the present invention may be implemented in any type of computer-based information handling system, including but not limited to general purpose or personal computers, workstations, hand-held computers, convergence systems, information appliances, Internet appliances, Internet televisions, Internet telephones, personal digital assistants (PDAs), personal information managers (PIMs), portable communication devices such as portable or mobile telephones, smart phones, hand-held devices, PDAs, or the like, having a wired or wireless network connection or capability, web browser (including wireless web browser) equipped devices, and so forth.

The network connection 160 may be an Internet connection made using the World Wide Web, although it will be recognized that the network interconnections depicted generally as 160 connecting the servers 110, 140, 150 and the remote client systems 120, 130 may include, for example, a local area network (LAN), metropolitan area network (MAN), wide area network (WAN), personal area network (PAN), and the like, and interconnections thereof.

Figure 6:
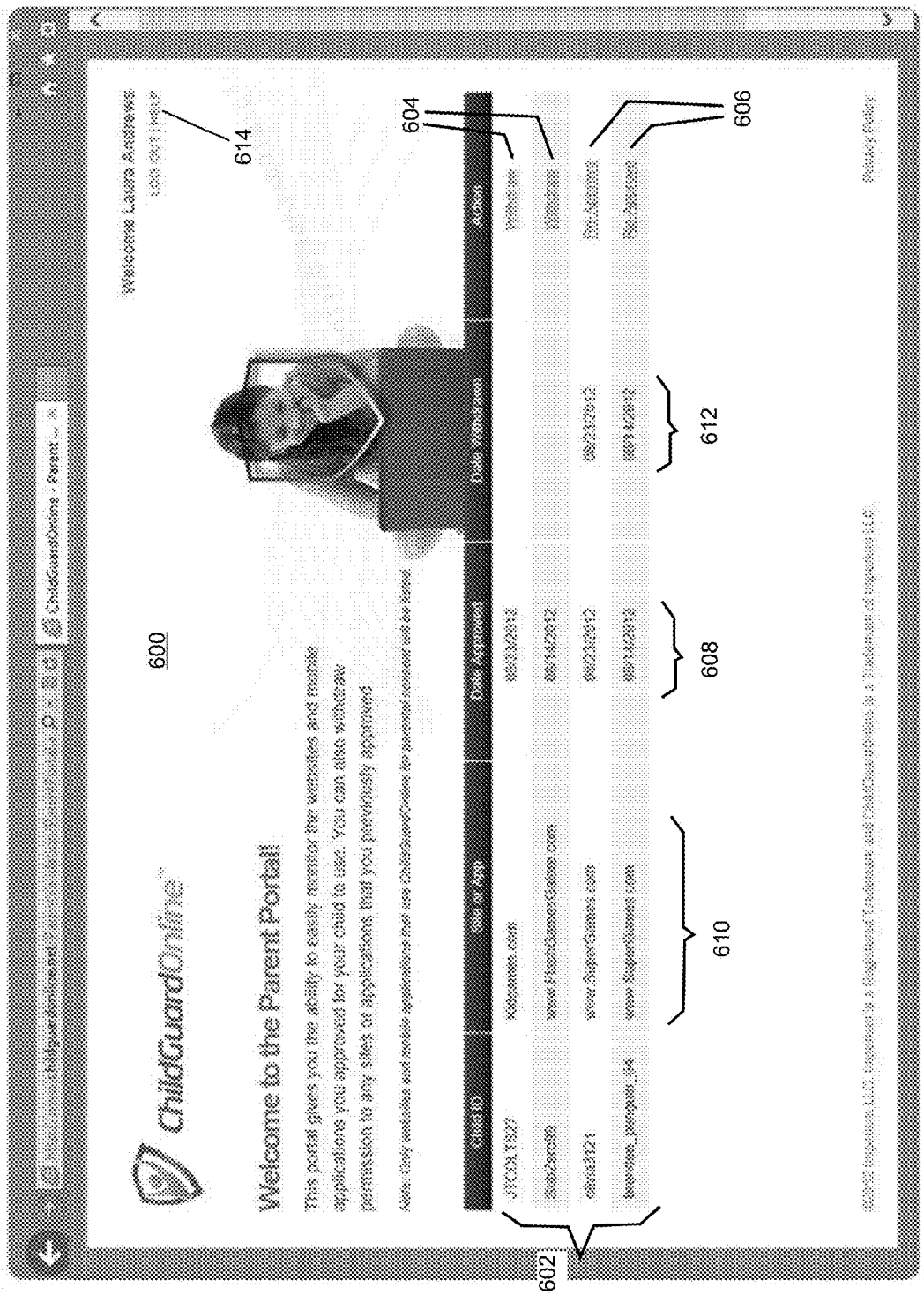
FIG. 6 illustrates an exemplary graphical user interface for the parent portal.

In the depicted preferred embodiment, the server computer system 140 and the client computer system 120, interact by exchanging information via the network 160 using hypertext transfer protocol (HTTP) requests to access web pages identified by uniform resource locators (URLs). Similarly, the server computer system 110 and the client computer system 130 interact via the network 160 using hypertext transfer protocol (HTTP) requests to access the parent portal for managing the parent's online consents. An exemplary parent portal web page is depicted in FIG. 6. The server 110 provides the requested web page to the client computer system 130 for display, e.g., using a browser, as is generally known in the art.

Figure 2:
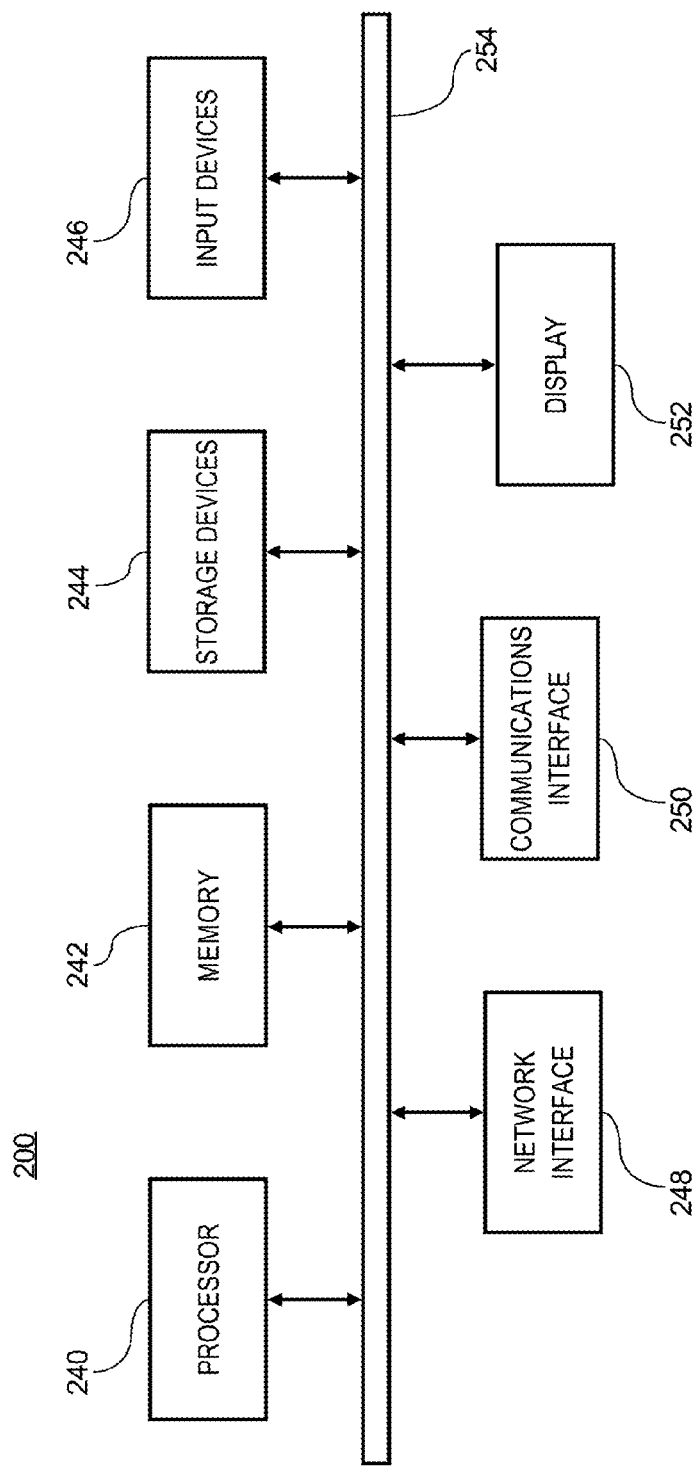
FIG. 2 is a block diagram of a hardware system generally representative of a computer-based information handling system of a type operable to embody the present invention.

Referring now to FIG. 2, there appears an exemplary information handling system 200 operable to embody the server 110 hardware of the present disclosure for running the verification software and configured to operate in the computer network 160. It will be recognized that the hardware configuration shown in FIG. 2 is likewise representative of an exemplary hardware configuration of the server system 140, the client computers 120, 130, and so forth. The hardware system 200 is generally representative of a computer-based information handling system, such as a PC, workstation, a minicomputer, mainframe computer, or the like.

The hardware system 200 includes a central processing system 240, a memory 242, one or more storage devices or auxiliary memory 244, one or more input devices 246, a network interface 248, a communications interface 250, and a display system 252 operably connected by a bus 254.

The hardware system 200 is controlled by the central processing system 240, which may include a central processing unit such as a microprocessor or microcontroller for executing programs, performing data manipulations and controlling the tasks of the hardware system. The processor 240 can be any suitable Intel, AMD, Motorola, or Sun processor, or the like. Communication with the central processor 240 is implemented through the system bus 254 for transferring information among the components of the hardware system.

The main memory 242 provides storage of instructions and data for programs executing on the central processing system 240. The main memory 242 is typically semiconductor-based memory as would be generally understood by persons skilled in the art. The storage devices 244 may include semiconductor based memory such as read-only memory (ROM), programmable read-only memory (PROM), erasable programmable read-only memory (EPROM), electrically erasable programmable read-only memory (EEPROM), flash memory, and so forth. The storage devices 244 may also include a variety of nonsemiconductor-based memories, including but not limited to hard disk, floppy disc, compact disc read-only memory (CD-ROM), digital versatile disc read-only memory (DVD-ROM), and so forth.

The display system 252 may comprise a display device and a video display adapter having the components for driving a display device, including video memory, buffer, and graphics engine as desired. The display device may comprise a video monitor such as a cathode ray-tube (CRT) display, liquid-crystal display (LCD), light-emitting diode (LED) display, gas or plasma display, and so forth. The input devices 246 may include devices such as a keyboard, mouse, touch pad, and so forth.

The network interface 248 may be connected to a network such as the network 160 appearing in FIG. 1, which may include a local area network (LAN), wide area network (WAN), personal area network (PAN), the Internet, and interconnections thereof, to communicate to other computers, external devices, networks, or information sources on the network 160. The network interface 248 may be a network adapter implementing, for example, Ethernet IEEE 802 standards (e.g., IEEE 802.3 for broadband and baseband networks, IEEE 802.3z for Gigabit Ethernet, IEEE 802.4 for token passing bus networks, IEEE 802.5 for token ring networks, IEEE 802.6 for metropolitan area networks, IEEE 802.15 for personal area networks, and so on).

The communications interface 250 may be connected to a network, such as the network 160 for communication with other computers or devices using an ISP and/or a dial up phone system to connect to the network. The communications interface 250 can be a modem, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on. It should be appreciated that the hardware system 200 of FIG. 2 is illustrative and exemplary only.

Figure 3:
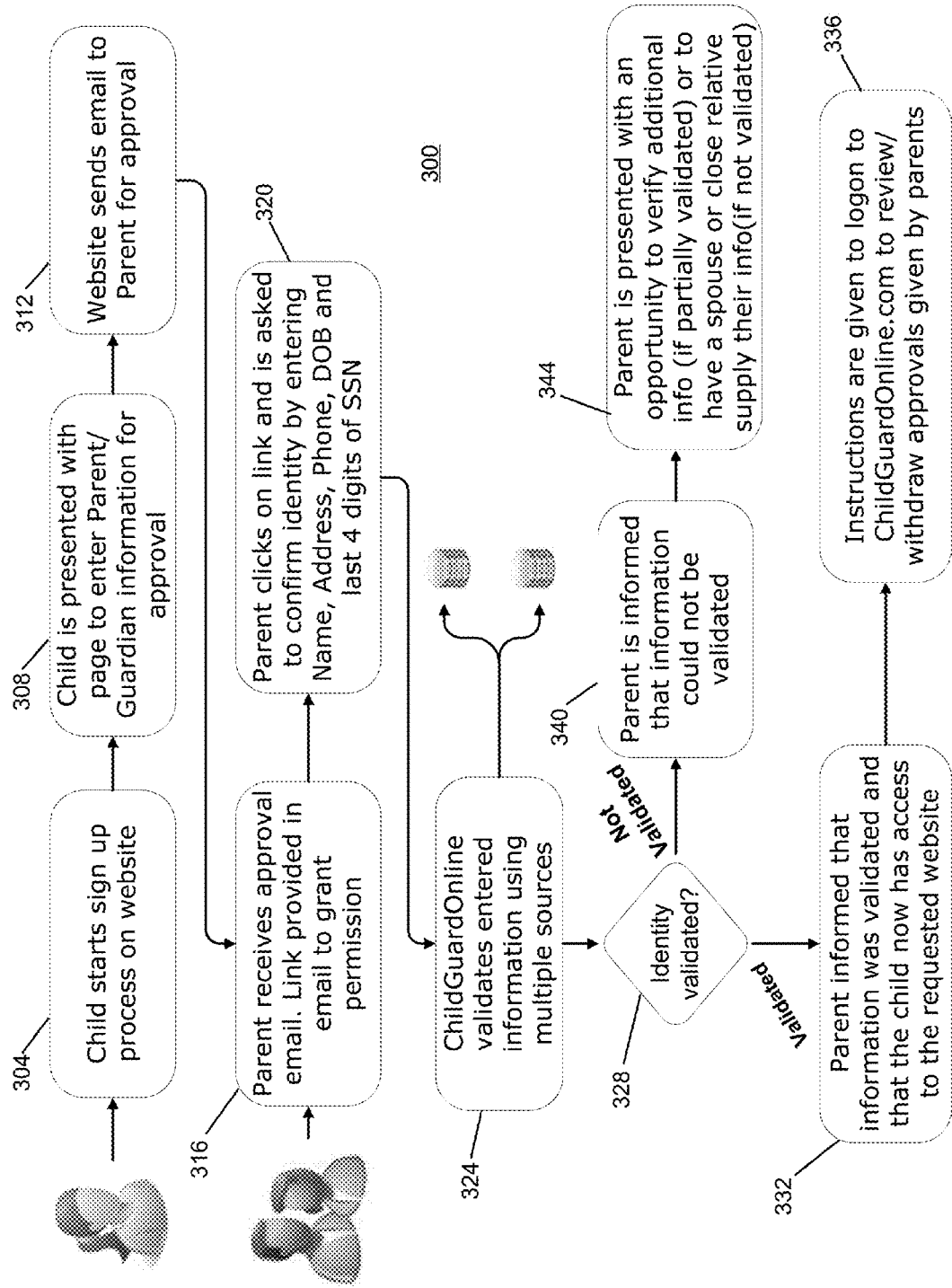
FIG. 3 is a flow diagram outlining the sign up process in accordance with an exemplary embodiment.

Referring now to FIG. 3, an exemplary parental consent verification method 300 begins at step 304 when the child user 122 starts a registration or sign in process to access a website or online content on the Internet service or content provider's server 140, e.g., by attempting to establish a user name and password for that site. At step 308, the child 122 is presented by the server 140 with a page that asks for the name and email address of a parent or guardian. The child 122 enters that information and is told that their parent or guardian (132) will receive an email with instructions for granting permission.

At step 312, an email is sent to the parent 132 informing the parent that the child has requested permission to establish an account on, and provide personal information to, the website 140 and at step 316 the email is received by the parent 132. Preferably, the email will come from the website 140, for example, to make the parent comfortable and to avoid spam filtering. It will be recognized, however, that the email could come from the verification service provider 110. A link or URL to a page which the parent 132 may use to grant permission is provided in the email. A link or URL to the site 140 may also be furnished in the email to provide the parent with an opportunity to review the site prior to granting or denying permission. Alternatively, the child could be asked to input the parent's mobile telephone number and a message containing link for providing approval could be sent to the patent in an SMS message or similar electronic communication to a browser-enabled mobile phone or smart phone.

At step 320, the parent clicks on the link in the email or otherwise accesses the web page 140 for parent approval. To confirm the identity (and other information about the parent, such as age) the parent will be asked for certain information. In a preferred embodiment, the requested information will include parent's name, address, phone number, date of birth, and last four digits of their social security number. The link or URL for granting parental permission may link to a web page on the server 140, wherein the collected data is forwarded to the server 110 for verification. Alternatively, the link or URL for granting parental permission may link directly to a web page on the server 110. Preferably, the parent is also informed at this time that if permission is granted, the parent may review or withdraw permission at any time by visiting the parent portal on the server 110.

At step 324, the server system 110 validates the identity of the parent 132 based on the parent information provided at step 320. The information may be verified by determining whether the personal information of the parent provided at step 320 matches or is consistent with data for that identity using one or more commercially available third party data brokers, aggregators, or like information services providers. Exemplary third party database or information service providers include EXPERIAN, AXIOM, credit bureaus, or the like. In preferred embodiments, the parental identification verification at step 324 is performed in real time or near real time.

At step 328, it is determined whether the parent's identity has been validated. If the system verifies that the information provided at step 320 is consistent with the third party data for the parental identity being validated, the process proceeds to step 332 and the parent is informed, e.g., by displaying in a web page displayed in a browser window on the parent computer system 130 that the child has been approved for the site. The child may then register to use or access the site or online content, which may include establishing a user account accessible with a user ID and/or password. At step 336, instructions may be provided to the parent 132 informing the parent 132 as to how the parent may access the parent portal on the server 110 for the purpose of reviewing and/or withdrawing the approval and any other approvals granted using the present system.

If it is determined at step 328 that the parent identity could not be validated based on the information provided at step 320, the process instead proceeds to step 340, wherein the parent is informed that the information provided by the parent could not be validated, and to step 344, wherein the parent 132 whose identity could not be validated is presented with the opportunity to provide additional identification information. Such additional information may include, for example, his or her full social security number. Alternatively or in addition, the parent 132 is presented with an opportunity to have a spouse or close relative supply their information (e.g., name, address, phone number, date of birth, and last four digits of their social security number). The process may then return to step 324 and repeat the validation step using the additional information provided.

In certain embodiments, additional information may be used to verify the parent identification and guard against fraud. For example, in certain embodiment, the location of the parent, e.g., as determined by the Internet Protocol (IP) address of the parent computer system 130, is compared to the parent address information submitted. In such embodiments, if the geographic location as determined by the IP address does not correspond with the parent address information provided, the system may determine that the parent identity cannot be validated as detailed above.

Alternatively or in addition to verifying the IP address geographic location, the verification system may monitor the number of children associated with a particular parent or guardian and/or the number of web sites approved for a particular child (or children of a particular parent) and may return an indication of non-validation in the event the number of children for a parent and/or the number of sites for a child exceed some predetermined threshold value. In addition or as an alternative to any of the fraud prevention measures noted above, the geographic location of the child (e.g., as determined by the IP address of the child computer system 120) can be compared to the parent's location (e.g., as determined by the IP address of the parent computer system 130) such that if the geographic location of the child is not sufficiently close to the location of the parent, the system may determine that the parent identity cannot be validated as detailed above.

Figure 4:
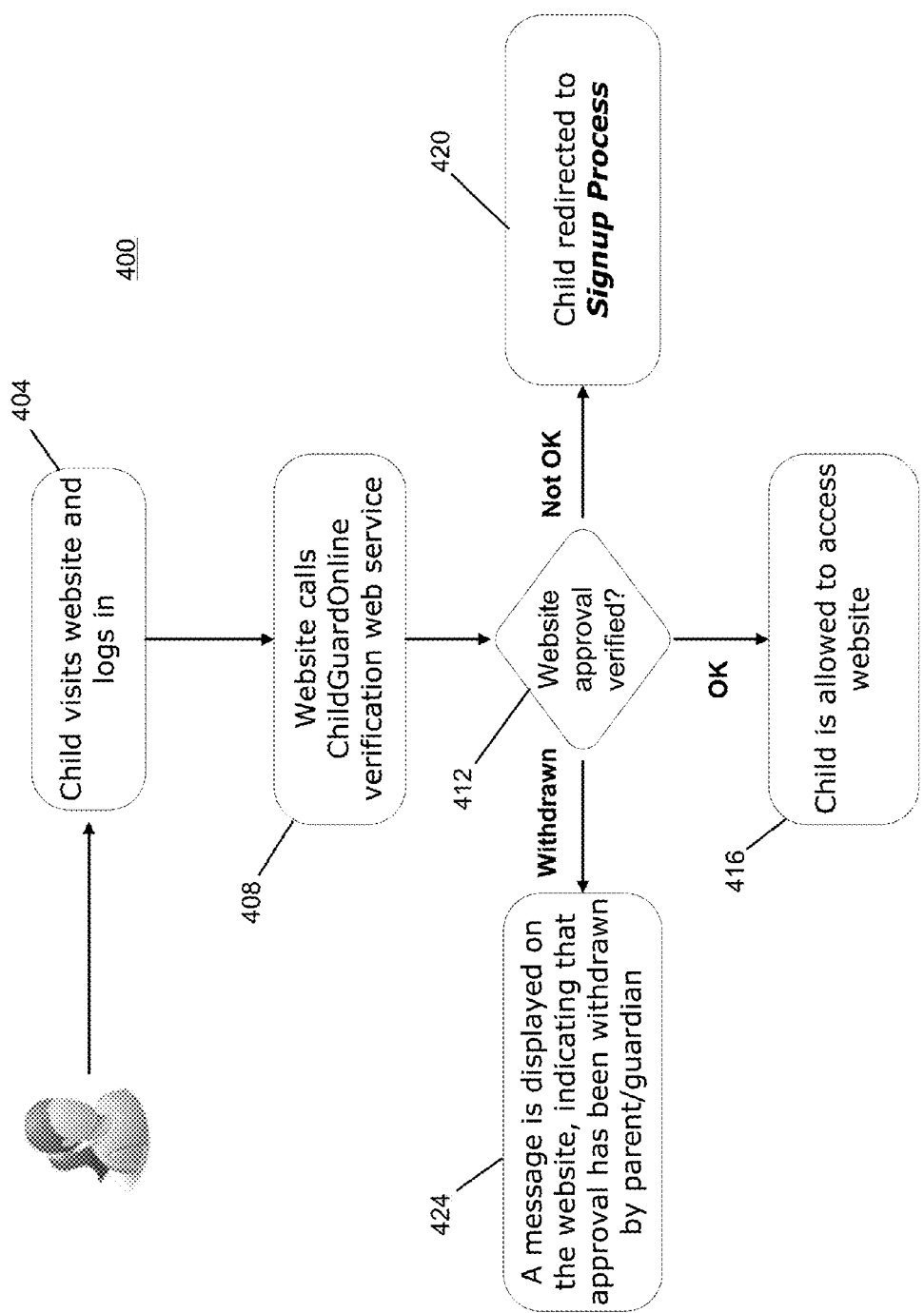
FIG. 4 is a flow diagram outlining the verification process in accordance with an exemplary embodiment.

Referring now to FIG. 4, there is shown a flow diagram outlining an exemplary verification process 400. At step 404, the child 122 visits the web site 140 and enters log in information for his or her account. At step 408, the web site 140 calls the verification software hosted on the server system 110 to determine whether the child 122 associated with the account has parental consent for the website 140. At step 412, the verification server system 110 determines whether the child has parental consent for the web site 140. If the parental consent has already been obtained and verified (i.e., using the process 300 outlined in FIG. 3), the process proceeds to step 416 and the child is allowed to access the site 140.

If it is determined at step 412 that parent approval has not been obtained (e.g., if the parental data has not been successfully obtained and verified as detailed above), the process proceeds to step 420 and the child is redirected to the sign up process (see FIG. 3, step 304). Finally, if it is determined at step 412 that previously granted and verified parental consent for the site 140 has been withdrawn by the parent 132, the process proceeds to step 424 wherein a message is displayed on the child computer system 120 that the approval has been withdrawn by the parent 132.

Figure 5:
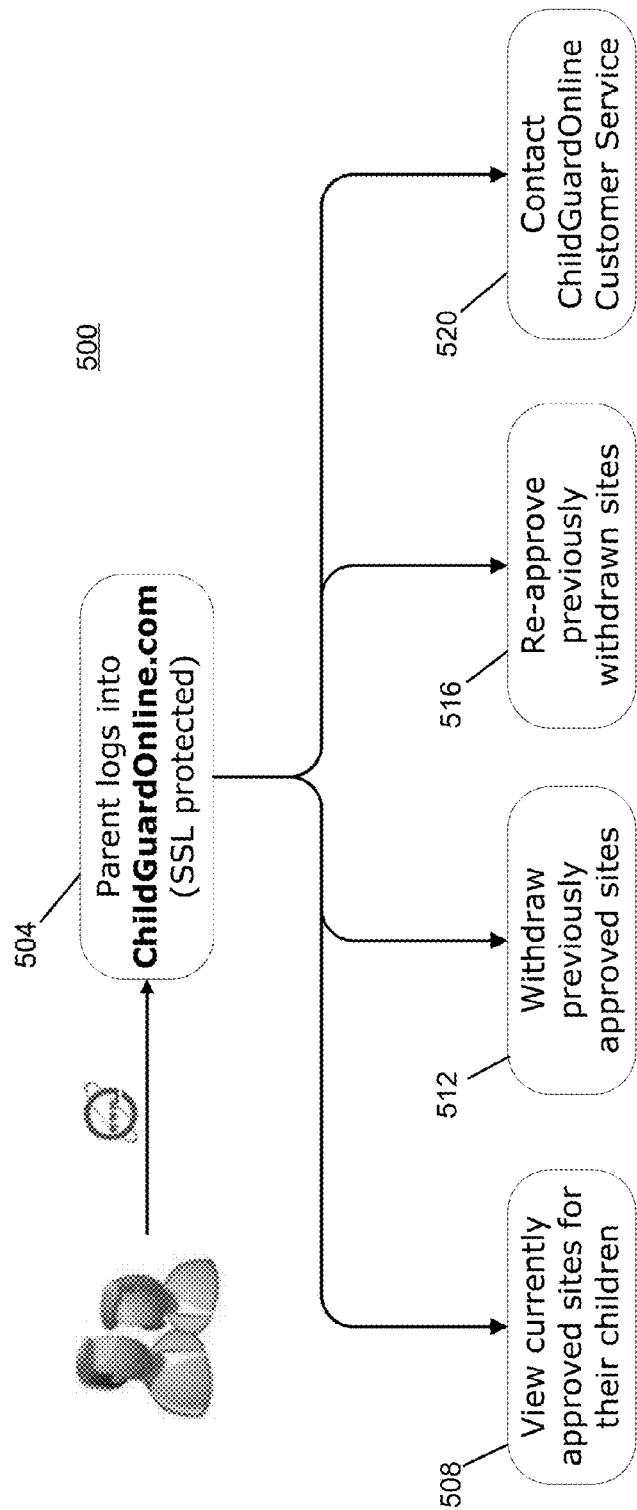
FIG. 5 is flow diagram illustrating the operation of a parent portal in accordance with an exemplary embodiment.

Referring now to FIGS. 5 and 6, FIG. 5 is a flow chart outlining an exemplary method 500 for allowing the parent 132 to review and, if desired, withdraw approvals previously granted using the verification system herein. FIG. 6 is an exemplary user interface 600 for the parent portal on the server 110 and accessible by parent users 132 via the network 160.

At 504 the parent logs on to the server system 110, preferably using a secure protocol such as secure socket layer (SSL) or the like. At 508, the parent 132 may view a list 610 of sites that have been approved for the child 122 and any other children for whom they have provided authorization (collectively, 602). At 512, the parent may selectively withdraw consent for any sites which were previously approved. In the illustrated exemplary embodiment, the prior consent may be withdrawn by clicking on a link 604, or other on-screen object, such as button, check box or the like. As 516, the parent may selectively re-approve previously withdrawn sites, e.g., by clicking on a link or other on screen object 606.

The exemplary interface 600 allows the parent to view the approval/withdrawal history via the approval date column 608 and withdrawal date column 612, although other formats are contemplated for viewing and navigating the parent portal, such as hyperlinks to additional web pages, tabbed windows, pop up windows, or the like. At 520, a link or other object 614 may be provided to allow the parent user 132 to contact the operator of the server system 110, e.g., for the purpose of obtaining customer service or otherwise managing the parental account.

The present systems and methods herein can be implemented as sets of instructions resident in the main memory of one or more computer systems. Until required by the computer system, the set of instructions may be stored in another computer readable memory such as a hard disk drive or in a removable memory such as an optical disk for utilization in a DVD-ROM or CD-ROM drive, a magnetic media for utilization in a magnetic media drive, a magneto-optical disk for utilization in a magneto-optical drive, or a memory card for utilization in a card slot. Further, the set of instructions can be stored in the memory of another computer and transmitted over a local area network or a wide area network, such as the Internet, when desired by the user. Additionally, the instructions may be transmitted over a network in the form of an applet that is interpreted after transmission to the computer system rather than prior to transmission. One skilled in the art would appreciate that the physical storage of the sets of instructions or applets physically changes the medium upon which it is stored, e.g., electrically, magnetically, chemically, physically, or optically, so that the medium carries computer readable information.

The description above should not be construed as limiting the scope of the invention, but as merely providing illustrations to some of the presently preferred embodiments of this invention. In light of the above description and examples, various other modifications and variations will now become apparent to those skilled in the art without departing from the spirit and scope of the present invention.

Having thus described the preferred embodiments, the invention is now claimed to be:

1. A method, comprising:
    receiving, in a computing device, a request to access content on a computer network, the request including an indication that the request is by an underage user;
    presenting to the underage user, by the computing device, a page for submitting contact information for a parent of the underage user;
    transmitting, by the computing device, an electronic communication to the parent of the underage user, the electronic communication including a link to a website of a third party validator, the website of the third party validator including an interface allowing the parent to grant approval of the underage user to access the content, the interface for receiving input of one or more items of personal information associated with the parent for validation of the parent's identity by the third party validator;
    receiving, in the computing device, an indication from the third party validator of whether or not the parent's identity has been validated based on the one or more items of personal information; and
    if the parent's identity has been validated, allowing the underage user to access the content.

2. The method of claim 1, wherein the content is selected from an Internet website and a mobile application.

3. The method of claim 1, further comprising:
    if the parent's identity has been validated, informing the parent that the parent's identity has been validated.

4. The method of claim 3, further comprising:
    if the parent's identity has been validated, providing the parent with instructions for logging on to the third party validator website for reviewing and/or withdrawing the approval.

5. The method of claim 4, further comprising:
    prior to allowing the underage user to access the content, receiving from the third party validator information indicating whether a prior approval has been withdrawn by the parent; and
    if the prior approval has been withdrawn by the parent, notifying the underage user that approval has been withdrawn and denying access to the content by the underage user.

6. The method of claim 1, further comprising:
    if the parent's identity has not been validated, denying the underage user access to the content.

7. The method of claim 1, further comprising:
    if the parent's identity has not been validated, informing the parent that the one or more items of personal information could not be verified and, optionally, presenting the parent with one or more opportunities to grant approval to the underage user to access the content.

8. The method of claim 7, wherein the one or more opportunities to grant approval to the underage user to access the content are selected from one or more of:
    an interface for the parent to enter the parent's full social security number;
    an interface for a spouse of the parent to enter one or more items of personal information associated with the spouse for verification of the spouse's identity by the third party validator; and
    an interface for another relative of the underage user to enter one or more items of personal information associated with the relative for verification of the relative's identity by the third party validator.

9. The method of claim 1, wherein the one or more items of personal information associated with the parent are selected from any one or more of the parent's name, address, phone number, date of birth, and last four digits of the parent's social security number.

10. The method of claim 1, wherein the content is a website that requires users to register personal information with the website prior to accessing the website.

11. The method of claim 1, wherein the indication that the request is by an underage user is an indication that the user is under 13 years of age.

12. The method of claim 1, wherein said one or more items of personal information includes address information, said method further comprising:
 using an IP address of the parent to identify a geographic location of the parent;
 comparing the geographic location of the parent to the address information; and
 if the geographic location is inconsistent with the address information, determining that the parent identity cannot be validated.

13. The method of claim 1, further comprising:
 using an IP address of the parent to identify a geographic location of the parent;
 using an IP address of the underage user to identify a geographic location of the underage user; and
 if the geographic location of the parent is inconsistent with the geographic location of the underage user, determining that the parent identity cannot be validated.

14. The method of claim 1, further comprising:
 monitoring the number of underage users associated with the parent, the number of websites approved for the underage user, or both; and
 if the number of underage users associated with the parent exceeds a first predetermined threshold, and/or the number of sites for the underage user exceeds a second predetermined threshold, returning an indication of non-validation of the parent's identity.

15. A method of verifying parental approval to access of content by an underage user, said method comprising:
 providing an electronic communication to a parent of the underage user, the electronic communication including a link to a website having an interface allowing the parent to grant approval of the underage user to access the content, the interface for receiving input of one or more items of personal information associated with the parent for validation of the parent's identity;
 receiving, in a computing device, a request to verify said personal information of the parent disclosed by the parent via the interface;
 validating the identity of the parent using the personal information disclosed via the interface by determining whether the disclosed personal information matches information associated with the parent stored in an information database managed by a third party;
 if the identity of the parent is validated, informing the parent that the identity of the parent was validated and that the child now has access to the requested website; and
 if the identity of the parent cannot be validated, informing the parent that the identity of the parent could not be validated.

16. The method of claim 15, wherein if the identity of the parent cannot be validated, requesting, using the computing device: (1) that the parent input additional information associated with the parent; (2) that another person authorized to grant approval for the underage user to access the content input one or more items of personal information associated with such other person; or both.

17. An identity validation system for verifying approval of a parent, the approval granted to allow an underage user to access content on a computer network, the system comprising:
 a processor for executing program code and memory combined with the processor for storing the program code;
 the program code including instructions for transmitting an electronic communication to the parent of the underage user, the electronic communication including a link to a website including an interface allowing the parent to grant approval of the underage user to access the content, the interface for receiving input of one or more items of personal information associated with the parent for validation of the parent's identity;
 a verification module for validating the identity of the parent by comparing the one or more items of personal information with information associated with the identity stored in an information database managed by a third party; and
 a parent module including computer storage that associates currently approved content with the underage user.

18. The identity validation system of claim 17, wherein the parent module further associates currently approved content for a plurality of underage users associated with the parent.

19. The identity validation system of claim 17, wherein the parent module further includes a user interface for receiving parental input withdrawing a previously granted approval.

20. The identity validation system of claim 19, wherein the parent module further includes a user interface for receiving parental input reapproving a previously withdrawn approval.

* * * * *